Patented July 16, 1929.

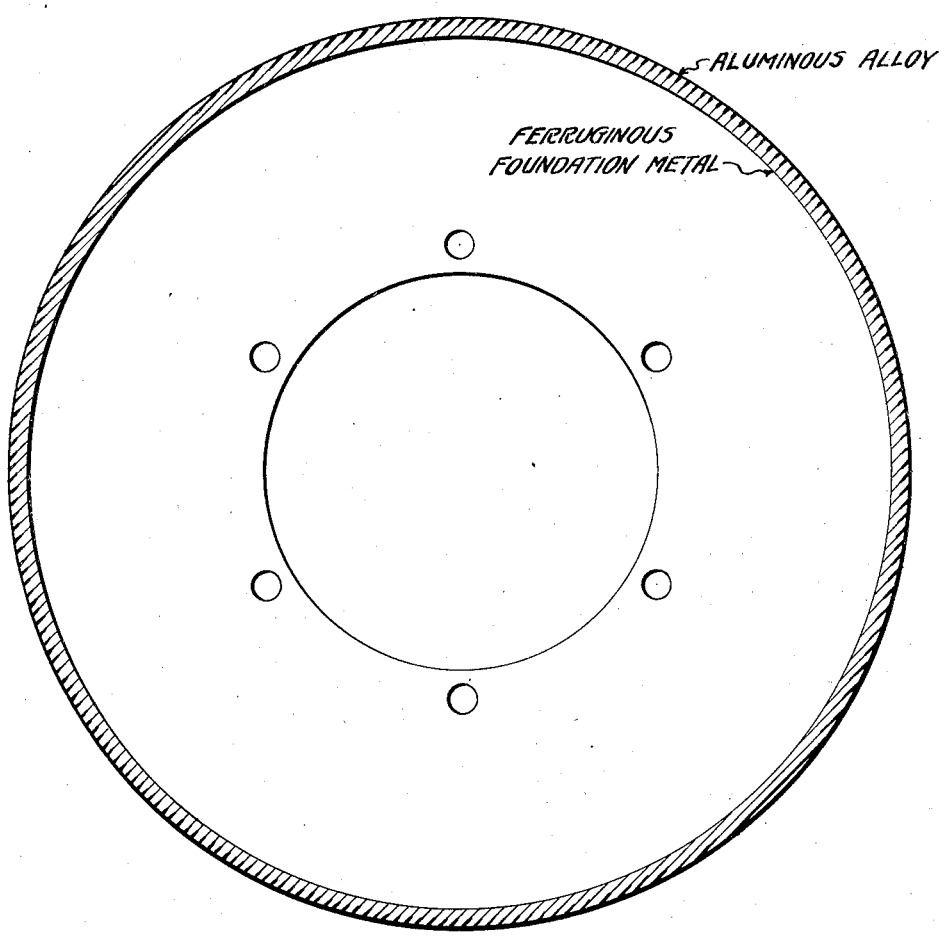
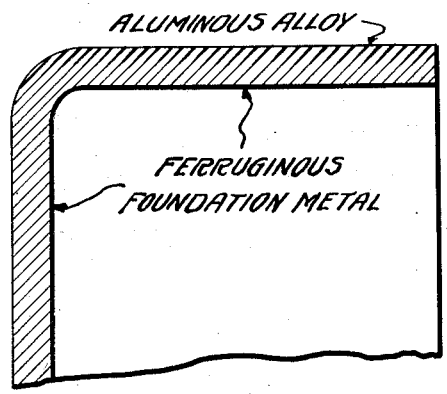

1,720,853

UNITED STATES PATENT OFFICE.

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS.

BRAKE APPARATUS.

Application filed May 2, 1928. Serial No. 274,675.

This invention relates to improvements in brake apparatus and more particularly to an improved brake drum.

It has long been recognized that it is advantageous to provide a brake drum with means for insuring rapid dissipation of heat. The desirability of this is apparent when it is considered that brake drums are subjected to frictional contact with a brake shoe or band generating considerable heat. The brake drums generally employed comprise a relatively massive ferruginous material of proportionately large heat capacity. The texture of the drum itself may not be uniform and hence when subjected, at elevated pressures resulting from generated heats, to the stresses necessarily imposed by brake application the drum tends to distort or lose its true circular shape. This tendency of the drum to depart from the circular form lowers the brake efficiency because of the fact that the eccentricity reduces the braking area. This distortion can be minimized by dissipating the generated heats as rapidly as formed.

The advantages of heat dissipation have been recognized but very few efficacious methods have been proposed for its accomplishment. The common expedient is to provide the exterior of the braking flange with a series of circumferential fins, thereby increasing the radiating and conductive surface of the drum. These fins represent an appreciable increase in weight and provide spaces for the lodgment of foreign matter and thus serve in effect to defeat the purpose of their employment.

It is an object of this invention to improve brake drums generally by providing novel means for increasing the dissipation of generated frictional heats.

It is another object to dissipate generated heat by providing a brake drum with a surface of high emissivity.

Yet another object is to provide a brake drum which comprises a plurality of metals of different thermal characteristics so designed as to increase the efficiency and life of the drum.

Yet another object is to provide a brake drum with a metallic surface which insures rapid conduction of the generated heat from the interior to the exterior of the drum.

With these and other equally important objects in view the invention comprehends the provision of a brake drum of ferruginous material which is coated, preferably on its outer surface, with a substance which has a higher caloric emissivity than the metal of the brake drum and which in addition protects the brake drum from corrosive action.

In the annexed drawings, Figure 1 is a cross sectional view of a brake drum, showing the differential metal structure.

Figure 2 is an enlarged detail showing the ferruginous brake drum and a cemented exterior coating of a different metallic material.

The major purpose of the invention, as intimated above, is to provide the exterior surface of the drum rotor with a protective coating from which heat is emitted or dissipated at a rapid rate. This may be achieved by two general methods; first by providing the exterior surface of the drum with the adherent coating of high heat emissivity and secondly by embedding or integrally forming on the drum a skin or ring of this character so as to form, in effect, a composite structure.

The desirable features of rapid heat dissipation and the concomitant advantage of minimized distortion may be obtained by many specific methods. One preferred manner of doing this is to provide the brake drum with a metallic coating which is embedded or incorporated in the drum itself so as to form an integral or composite structure.

The preferred method of effectuating this concept is to thoroughly clean the foundation metal, as by pickling, sand blasting, wire brushing and the like. The cleaned metal is thereafter placed in a mass of finely divided aluminum and heated under calorizing conditions. A number of different specific methods may be employed for this purpose. For example the exterior surface of the drum may contact with a mass comprising aluminum powder in which is incorporated a small quantity of ammonium chloride and zinc. During this process the interior surface of the drum may be filled with a block of some inert material so as to restrict the action to the outside surface of the drum. The mass may then be heated to calorizing temperatures which preferably may range from 900° C. to 950° C. Under the conditions of this or any other calorizing treatment the aluminum is alloyed with and dispersed through the metal of the drum adjacent the contact surface. It will be understood that the heating may be varied in extent and intensity to regulate the character and degree of combination and relative diffusion of the two metals. In this condition the aluminum alloys with the iron to form a substantially integral metallic skin or cemented coating. After the metal has been treated under the desired conditions the drum may be removed and, if desired, subjected to heat treatment to modify, to any desired extent, the properties of the coated alloy.

It will be appreciated that, as shown on the drawing the article produced by this process comprises a drum made up of metals of different physical characteristics. The metallic coating of an aluminous alloy has a lower corrodibility than the foundation metal. In addition to this it has a coefficient of thermal conductivity which is greater than that of the foundation metal and hence provides an easy path for the conduction of heat from the interior to the exterior of the drum. It is to be observed further that when the finished drum is exposed to the oxidizing conditions of the atmosphere a dull, thin, adherent coating of the oxide of the non-ferrous metal may be formed on the exposed surface. This film not only functions to prevent further oxidation by interposing a mechanical protective coating, but also serves to increase the emission of radiant heat above that which would obtain for a clean metal surface, for, as has been pointed out, certain oxides like aluminum oxide have an emissivity factor which is the approximate equal to that of a black body.

The composite structure presents a further advantage. The iron and aluminous alloy, as will be appreciated, have different coefficients of thermal expansion. As a result of this when the drum is heated the skin or outer layer of alloy will tend to check distortion of the drum by interposing a positive resistance to displacement of the ferruginous body. Thus it will be seen that the article combines in one unified structure the advantages of low corrodibility, high heat dissipation and minimal distortion characteristics.

It is to be clearly understood that the preceding example is given merely for the purpose of explaining the underlying principles of the invention which comprehend the concept of providing a composite brake structure made up of metals of different physical characteristics. It will be appreciated that metals other than aluminum may be utilized to form a layer of alloy integrally united with the ferruginous base member. Aluminum has been described as suitable for this purpose and is to be taken as typifying any metal which may be combined in the manner described to produce a skin or outer surface which has a greater thermal conductivity than iron and which possesses a greater resistance to corrosion.

The term cemented is used to designated an intermolecular bonding of two or more metallic elements.

I claim:

1. A brake drum comprising a ferruginous foundation metal having an exterior surface of greater thermal conductivity than the foundation metal.

2. A brake drum comprising a foundation metal and a cemented metallic surface of greater thermal conductivity than the foundation metal.

3. A brake drum comprising a foundation metal and a cemented exterior metal surface of greater thermal conductivity than the foundation metal.

4. A brake drum comprising a foundation metal and an integral metal surface of greater thermal conductivity and lower corrodibility than the foundation metal.

5. A composite brake drum comprising a foundation metal and an exterior metal surface of greater thermal conductivity and lower corrodibility than the foundation metal.

6. A composite brake drum comprising a foundation metal and a surface thereon comprising an aluminous material.

7. A calorized brake drum.

8. A ferruginous brake drum having an exterior surface of an aluminous material cemented to the ferruginous material.

9. A brake drum comprising a ferruginous material through at least a portion of which aluminum is dispersed.

10. A composite brake drum including a ferruginous foundation metal and an exterior surface layer comprising an aluminum alloy of the ferruginous metal.

11. A brake drum comprising a ferruginous material coated with a metal oxide which has a higher emissivity than the ferruginous material.

12. A brake comprising ferruginous material having a portion of its surface alloyed with aluminum to increase the heat transmission through and lower the corrodibility of such surface.

In testimony whereof I affix my signature.

RAYMOND J. NORTON.